United States Patent Office 2,806,865
Patented Sept. 17, 1957

2,806,865

NEW FLUORINE-CONTAINING COMPOUNDS AND METHOD OF PREPARATION THEREOF

William S. Barnhart, Cranford, and Robert H. Wade, West Paterson, N. J., assignors to The M. W. Kellogg Company, Jersey City, N. J., a corporation of Delaware No Drawing. Application August 27, 1954, Serial No. 452,703

18 Claims. (Cl. 260—408)

This invention relates to a new and useful class of polyfluoro and polyfluorohalogenated organic compounds and to new methods of preparation for both this new class of compounds and for useful compounds already known. In particlular, it relates to new polyfluorohalogenated carboxylic acids and their salts and to new methods of preparation of polyfluorocarboxylic acids and polyfluorohalogenated carboxylic acids and their salts.

It is known that polyfluoro alkanoic acids and polyfluoropolychloro acids may be prepared by heating a completely halogenated ethylene with methanol in the presence of a free radical producing catalyst to produce polyfluoro alkanols of the formula $$H—(CF_2—CF_2)_nCH_2OH$$

or the corresponding polyfluoropolychloro alkanols, and thereafter oxidizing the alkanols to alkanoic acids. The polyfluoro alkanoic acids and polyfluoropolychloro alkanoic acids, thus produced, are useful compounds in that they have good chemical stability and inertness toward acids, alkalis and oxidizing agents, and in that they are compatible with fluorocarbon polymers and fluorochlorocarbon polymers. However, such polyhalo alkanoic acids are not as stable as they would be without the hydrogen atom on the terminal carbon furthest removed from the carboxylic group, since its presence may lead to the elimination of hydrogen halide and thereby result in the corrosion of metal parts. This elimination may lead to further breakdown of the halo acid due to the reactivity of the carbon-carbon double bond thus produced.

It is also known that perfluoro alkanoic acids having the general formula $$F—(CF_2)_n—COOH$$

may be prepared by the electrochemical fluorination of alkanoic acids in anhydrous hydrogen fluoride with subsequent hydrolysis of the resulting fluorinated acid fluorides. Such acids, being completely halogenated, are very stable. However, this method has not been shown to be applicable to the preparation of long chain fluoroperhalo alkanoic acids, containing halogen atoms other than fluorine, and the presence of other halogen atoms is often desirable to impart increased compatibility with polymers containing halogen atoms other than fluorine. Furthermore, the yield of long chain acids is likely to be lowered due to the increased statistical probability of scission in the fluorination of long chain alkanoic acids.

It has recently been found that perfluoro and fluoroperhalo alkanoic acids may be prepared by the oxidation of a perhalogenated olefin, preferably an olefin, having at least 7 carbon atoms and being at least half fluorinated. The perhalogenated olefins are ordinarily prepared by the thermal cracking of high molecular weight homopolymers or copolymers or perfluoro and/or perfluorochloro olefins. The oxidation reaction is preferably carried out in the presence of potassium permanganate at subzero temperatures. This method is limited in that the chain lengths of the alkanoic acids are determined by the positions of the double bonds in the thermally cracked product and thus cannot be predicted with any degree of accuracy. It is not possible by this method to produce predictably any particular desired alkanoic acid.

A method for the preparation of fluoroperchloro carboxylic acids having an even number of carbon atoms, by the treatment with fuming sulfuric acid of a sulfuryl halide telomer of a halogenated olefin, such as chlorotrifluoroethylene, has recently been discovered. A detailed description of this method and of the novel fluoroperchloro acids produced thereby may be found in our copending application, Serial No. 452,705, filed August 27, 1954.

It is an object of this invention to provide new polyfluorohalogenated aliphatic carboxylic acids and their salts.

It is a further object of this invention to provide a method of preparing fluoroperhalo aliphatic carboxylic acids and their salts having an odd number of carbon atoms in the aliphatic chain.

It is a further object of this invention to provide a new method of preparing perfluoro aliphatic carboxylic acids and their salts.

It is a further object of this invention to produce new fluorohalo aliphatic carboxylic acids of specific structure in high yields.

Still another object of this invention is to produce new perfluoro and fluoroperhalo aliphatic dicarboxylic acids which are useful in condensations with polyalcohols to producelong chain highly halogenated polymers.

Still another object of this invention is to produce new fluoroperhalo aliphatic carboxylic acids and salts which are useful as dispersing agents for the emulsion polymerization of halogenated olefins.

Still another object of this invention is to produce new fluoroperhalo aliphatic carboxylic esters which are useful as softening agents and plasticizers for the halogenated polymers.

Still another object of this invention is to produce new fluoroperhalo aliphatic carboxylic acids which may be used as gelling agents in grease compositions containing chlorotrifluoroethylene polymers.

Still another object of this invention is to produce new fluoroperhalo aliphatic carboxylic acids which are thermally stable and may be heated indefinitely to temperatures of 200° C. and above.

Still another object of this invention is to produce new fluoroperhalo aliphatic carboxylic acids and salts which may be used as surface active agents which can be used in highly acid and/or highly oxidative environments, as, for example, in electroplating baths, where ordinary surface active agents would be decomposed.

Other objects will appear hereinafter.

These and other objects and advantages are obtained by treating with fuming sulfuric acid a fluorine containing telomer prepared by telomerizing an olefin which is preferably at least half fluorinated in the presence of a perhalogenated methane containing a bromine atom.

The preferred telomers which are treated according to this invention are those with the general structure, $$CCl_3—(CF_2—CFCl)_n—Br$$

wherein $n$ is an integer from 1 to about 16. These telomers are prepared by the telomerization of chlorotrifluoroethylene in the presence of the telogen, bromotrichloromethane. The telomerization preferably takes place in the presence of benzoyl peroxide which is dissolved in the bromotrichloromethane while the chlorotrifluoroethylene monomer is added under pressure in a closed system. In a specific example, 3.5 parts of benzoyl peroxide may be dissolved in 408 parts of bromotrichloromethane and charged to a pressure vessel along with 300 parts of chlorotrifluoroethylene. The system is heated for about 4 hours at about 100° C., with agitation to produce high yields of relatively low molecular weight polymers having the above formula. The telomeric product is relatively easy to separate into its individual compounds by distillation since it contains only compounds having an odd number of carbon atoms, so that each compound has a boiling point relatively far removed from that of the next lower or next higher compound.

Telomers produced by perhalomethanes other than bromotrichloromethane as telogens may also be used, provided they contain a bromine atom and provided they do not produce, at the end of the telomer molecule opposite the bromine atom, an end group which is more easily hydrolyzed than the CFClBr end group which is converted to a carboxylic acid end group in accordance with this invention. The preferred telogens other than bromotrichloromethane are the perhalogenated methanes: bromotrifluoromethane, bromochlorodifluoromethane, bromodichlorofluoromethane, dibromodifluoromethane, and dibromochlorofluoromethane. All of these telogens produce telomers containing a CFClBr group at one end of the molecule and containing at the opposite end a perhalomethyl group which is not more susceptible to hydrolysis than the aforesaid CFClBr group. For convenience, these perhalomethyl groups may be designated as those having a total atomic weight not higher than 146.5, the atomic weight of the bromochlorofluoromethyl group.

Telomers produced from perhalogenated monomers other than trifluorochloroethylene may also be used as starting materials in this invention. Among the perhalogenated monomers which may be used, in addition to chlorotrifluoroethylene, are tetrafluoroethylene and unsymmetrical dichlorodifluoroethylene. In general, the perhalogenated monomers may be designated as those having the structure $CF_2=CX_1X_2$ wherein $X_1$ and $X_2$ are selected from the group consisting of fluorine and chlorine atoms.

These monomers may be either homotelomerized or cotelomerized with each other or with other halogenated olefins, including hydrogen-containing olefins. In order to maintain the chemical stability of the final products, it is preferred that the hydrogen content be kept at a minimum so that the hydrogen-containing olefins should contain at least two fluorine atoms. For optimum stability, it is preferred that no hydrogen be present. Among the halogenated olefins which may be cotelomerized with the aforesaid perhalogenated monomers are, symmetrical dichlorodifluoroethylene, trifluoroethylene and vinylidene fluoride. To produce high yields of fluoroperchloro aliphatic acids of specific structure, homotelomers must be used, since it is impossible to predict the order of alignment of the individual comonomer units in a cotelomer.

The telomers produced from such monomers by telomerization with the forementioned telogens may be designated as $M-(CF_2-CX_1X_2)_n-Br$ wherein $X_1$ and $X_2$ are halogen atoms selected from the group consisting of fluorine and chlorine atoms, M is a perhalomethyl radical having a total atomic weight not higher than 146.5, and $n$ is an integer from 2 to 16. These telomers, when reacted with fuming sulfuric acid, produce monoacids of the formula

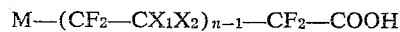

$$M-(CF_2-CX_1X_2)_{n-1}-CF_2-COOH$$

and diacids of the formula

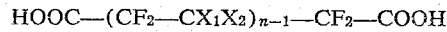

$$HOOC-(CF_2-CX_1X_2)_{n-1}-CF_2-COOH$$

wherein $X_1$, $X_2$, M and $n$ are defined as above, depending upon the conditions of treatment.

The telomers produced from the aforesaid monomers by telomerization with the particular telogen, bromotrichloromethane, may be designated as

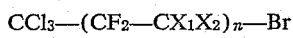

$$CCl_3-(CF_2-CX_1X_2)_n-Br$$

wherein $X_1$ and $X_2$ and $n$ are defined as above. Such telomers produce monoacids of the formula

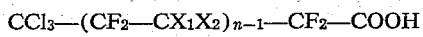

$$CCl_3-(CF_2-CX_1X_2)_{n-1}-CF_2-COOH$$

and diacids of the formula

$$HOOC-(CF_2-CX_1X_2)_{n-1}-CF_2-COOH$$

wherein $X_1$, $X_2$ and $n$ are defined as above, again depending upon the conditions of treatment.

The telomers produced from chlorotrifluoroethylene with any of the aforementioned telogens may be defined as having the formula $M-(CF_2-CFCl)_n-Br$ wherein M and $n$ are defined as above. Such telomers, when reacted with fuming sulfuric acid, produce acids of the formula $Z-(CF_2-CFCl)_{n-1}-CF_2-COOH$, wherein Z is a single carbon mono-functional radical selected from the group consisting of carboxylic acid radicals and perhalomethyl radicals having a total atomic weight not higher than 146.5, and wherein $n$ is defined as above. More specifically, depending upon the conditions of treatment, such reaction will produce monoacids of the formula $M-(CF_2-CFCl)_{n-1}-CF_2-COOH$, and diacids of the formula $HOOC-(CF_2-CFCl)_{n-1}-CF_2-COOH$.

The telomers produced by the telomerization of chlorotrifluoroethylene with bromotrichloromethane may be designated as $CCl_3-(CF_2-CFCl)_n-Br$, wherein $n$ is defined as above. Such telomers, when reacted with fuming sulfuric acid, produce monoacids of the formula $CCl_3-(CF_2-CFCl)_{n-1}-CF_2-COOH$ and diacids having the formula defined in the last paragraph.

The process of this invention is applicable to telomers containing from 2 to about 16 monomer units. Telomerization with any of the aforesaid perhalo methanes as telogens produces good yields of telomers having up to about 16 monomer units. Telomers containing up to about 16 monomer units are distillable at reduced pressures of the order of 1 to 0.1 mm. of mercury, the longest of these telomers distilling, at the reduced pressure, at a temperature of about 250° C. Telomers of longer chain length are not readily distillable in that they require higher temperatures at which substantial decomposition begins to take place.

For optimum surface active properties and for optimum compatibility with perhalogenated polymers, it is desirable that the carboxylic compounds of this invention have a chain length of at least 7 carbon atoms. In other words, the preferred carboxylic compounds are those wherein $n$ is an integer from 3 to 16, or those having a chain length of from 7 to 33 carbon atoms.

The telomers suitable as starting materials for the purpose of this invention are prepared, as stated above, by directly polymerizing the fluoroethylene monomer in the presence of a catalyst and one of the above-mentioned telogens. The yield of telomer of desired chain length will vary with the relative ratio of telogen to monomer, with higher ratios producing a predominance of low molecular weight material, and lower ratios producing a predominance of high molecular weight material. In general, telomers produced by any ratio of telogen to olefin from about 1 to 5 to about 3 to 1 may be used. To produce a high yield of telomer containing from 3 to 16 monomeric units, it is preferred that the telogen to olefin ratio be about 1 to 1.

Catalysts other than benzoyl peroxide, such as di-t-butyl peroxide or dichlorobenzoyl peroxide, may be employed. Favorable results are obtained by using 1% by weight benzoyl peroxide based on the monomer.

Inert solvents may or may not be present in the telomerization process. An inert solvent is any liquid which does not materially alter the normal polymerization of the fluoroethylenic compound in the presence of bromotrichloro methane or other bromohalo methanes.

Carbon tetrachloride and tetrachloroethylene are examples of such solvents. It is to be noted that carbon tetrachloride is itself a telogen, but considerably less effective than, for example, bromotrichloromethane, and may, therefore, be regarded as substantially inert.

The telomers described above are hydrolyzed to the corresponding carboxylic acids by treatment with concentrated sulfuric acid containing sulfur trioxide at elevated temperatures. By controlling the temperature, duration of treatment and concentration of the fuming sulfuric acid, monoacids and/or diacids are produced.

With respect to the bromo trichloromethane telomer of chlorotrifluoroethylene, it was found, surprisingly, that the CFClBr end group was hydrolyzed before the $CCl_3$ end group. This unexpected result permits the production of monoacids or diacids, as desired, by control of the conditions of treatment.

The monoacids and diacids of the present invention are formed by subjecting the telomers described above, and particularly the telomers 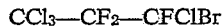 to hydrolysis with concentrated sulfuric acid containing between about 10 and about 70% $SO_3$, at temperatures ranging from about 125° C. to about 300° C. for a period ranging from about 5 to about 50 hours. In general, the lower concentrations of fuming sulfuric acid (containing less than about 20% $SO_3$, for example), lower temperatures (between about 125° C. and about 175° C.) and shorter reaction time (10 to 25 hours), are sufficient to hydrolyze the —CFClBr group to —COOH, the diacid being formed in lower yield, if at all, under such conditions. For example, subjection of $CCl_3$—$CF_2$—CFClBr to hydrolysis with 10% fuming sulfuric acid at 150° C. for 10 hours produced the monoacid $CCl_3$—$CF_2COOH$ as the major acidic product of the reaction. On the other hand, treatment of $$CCl_3\text{—}CF_2\text{—}CFClBr$$

with 10% fuming sulfuric acid at 180 to 190° C. for 48 hours produced good yields of the monoacid and the diacid $HOOC$—$CF_2$—$COOH$.

It is not necessary to operate at the highest extreme of temperature and the highest extreme of $SO_3$ concentration at the same time in order to obtain good yields of diacid. Actually, in a practical sense, one is ordinarily limited to the equilibrium concentration of $SO_3$ in fuming sulfuric acid for any particular temperature of operation. Thus, it may be necessary to sacrifice $SO_3$ high concentration in order to achieve high operating temperature, and vice versa. The optimum combination of conditions for producing high yields of diacids is about 10% fuming sulfuric acid at 160° C.

It is possible, of course, to increase the equilibrium concentration of $SO_3$ in fuming sulfuric acid at a particular temperature by increasing the pressure on the system. However, volatile inorganic materials are by-products of this reaction and have, at any particular temperature, a much higher vapor pressure than $SO_3$. Consequently, any increase in the total pressure of the system is primarily taken up by the partial pressure of these volatile gases and produces comparatively little effect with respect to the partial pressure of $SO_3$.

The reaction is conveniently carried out in a glass or preferably in a metal vessel equipped with a thermometer, stirrer and reflux condenser, the latter being fitted with a tube leading to a vessel containing water or basic solution. The latter device is necessary to trap the $SO_3$ fumes, and any other vapors evolved during the course of the reaction. The hydrolysis may be conducted under an atmosphere of nitrogen or other inert gas. The hydrolysis to the monoacid is assumed to be complete when the evolution of bromine vapors is no longer observed. Upon completion of the reaction, the reaction mixture is cooled and poured over ice, and the organic material isolated by ether extraction of this aqueous mixture. Any unreacted starting material may be separated from the acidic product by subjection of the ether extract to distillation under reduced pressure. An alternative procedure is to basify the aqueous mixture with a basic reagent such as sodium hydroxide, followed by ether extraction to remove the non-acidic starting material. The basic mixture is then reacidified with $H_2SO_4$ and ether extracted. Subjection of the concentrated ether extract to distillation under reduced pressure will yield the acidic product which, if solid, may be further purified by crystallization and/or redistilled.

Other organic solvents which may be used to extract the organic material from the aqueous mixture are carbon tetrachloride; chloroform; methylene chloride; 1,1,2-trichloro-1,2,2-trifluoroethane, etc. The acids have been characterized by conventional means, such as by preparation of various salts and by the determination of their neutralization equivalents, boiling points, melting point, surface tension and by chemical analysis.

A more advantageous method of isolating the desired carboxylic acids involves direct extraction of the reaction product with a low-boiling organic solvent which is insoluble in fuming sulfuric acid. Among the solvents which may be used are methylene chloride, 1,2,2-trichloro-1,1,2-trifluoroethane (Freon 113), carbon tetrachloride, chloroform, 1,1-dichloroethane, trichlorofluoromethane, 1,1,1-trichloroethane and others.

The advantages of this latter method lie in eliminating the necessity of treating large volumes of fuming sulfuric acid with water and in permitting the reuse of the fuming sulfuric acid. The method also permits the use of vessels made of materials (e. g., carbon steel) which are resistant to anhydrous sulfuric acid, but not to dilute sulfuric acid.

The extract is washed with 25% HCl to remove sulfuric acid and then distilled, with the solvent coming off as the first fraction.

Under the conditions of the fuming sulfuric acid treatment, some formation of acid anhydrides may occur. The dicarboxylic 5 carbon acid readily forms a cyclic anhydride, while monocarboxylic acids may combine to produce acyclic anhydrides of higher molecular weight. Despite their higher molecular weight, the acyclic anhydrides are lower-boiling than the monocarboxylic acids from which they are derived since the acids are strong acids and highly polar compounds and since the loss of polarity has a greater effect on boiling point than molecular weight increase. The cyclic anhydride is, of course, lower-boiling than the diacid from which it is formed since both the polarity and the molecular weight are decreased.

These anhydrides are readily converted to the acids from which they are derived by the addition of water. On the other hand, the acids may, if desired, be converted to anhydrides by reaction with $SO_3$ or $P_2O_5$.

Carboxylic acids, both monoacids and diacids, produced by this invention, are strong acids and react readily with alkali metal, alkaline earth and other metal hydroxides, carbonates and other basic compounds, to produce corresponding metal salts. The acids also react with gaseous ammonia or with ammonium hydroxide to produce ammonium salts. Metal and ammonium salts of the monocarboxylic acids containing at least 7 carbon atoms are particularly useful as emulsifying agents in the emulsion polymerization of perhalo polymers.

Esters of the foregoing carboxylic acids are also easily prepared by usual esterification methods involving the reaction of the mono-acid or diacid with an aliphatic or aromatic alcohol and the removal of water therefrom. Water may be removed by the presence of a water removal agent, such as concentrated sulfuric acid, or preferably, may be removed by continuous distillation during the esterification reaction. Esters of the monoacids are particularly useful as softening agents for perhalogenated polymers, and esters of the diacids with poly alcohols form long chain highly halogenated polymers with advantageous properties.

EXAMPLE 1

(a) Hydrolysis of $CCl_3-(CF_2CFCl)_2Br \rightarrow$
$$CCl_3-CF_2-CFCl-CF_2-COOH$$

A stirred mixture of 108 grams (0.25 mole) of
$$CCl_3(CF_2CFCl)_2Br$$
(B. P. 118°/20 mm.) and 130 ml. of fuming sulfuric acid (20% $SO_3$) was heated to 130–140° C. for 10 hours in a reaction flask fitted with a mechanical stirrer. Bromine and acid vapors were evolved during the 10 hours after which time the homogeneous mixture was poured onto 1000 grams of ice. The pH of the solution was adjusted to pH 10 with sodium hydroxide solution and 9 grams of non-acidic starting material were recovered by ether extraction. The basic solution was concentrated to about 1900 ml., reacidified with concentrated sulfuric acid, and extracted with ether for 7 days in a continuous extractor. Concentration of the ether extract yielded 61 grams (80% yield) of product oil. Distillation of the oil at reduced pressures yielded a total of 49.5 grams of acidic material with the following characteristics:

| Fraction | Boiling point, °C. | P, mm. | Wt., grams oil | Solubility in NaOH |
|---|---|---|---|---|
| 1 | 44–126 | 21 | 0.5 | Partly soluble. |
| 2 | 126–39 | 20 | 6 | Soluble. |
| 3 | 139–47 | 20 | 15.5 | Do. |
| 4 | 147–57 | 20 | 10.5 | Do. |
| 5 | 151–60 | 20 | 6 | Do. |
| 6 | >160 | 20 | ¹11 | Do. |
| | | | 49.5 | |

¹ Crystallized.

(b) Hydrolysis of $CCl_3(CF_2-CFCl)_2Br$

Hydrolysis of 453 grams (1.05 moles)
$$CCl_3(CF_2-CFCl)_2Br$$
(B. P. 115–130°/20 mm.) was effected by heating this halocarbon with 100 ml. of 65% fuming sulfuric acid and 215 ml. of concentrated sulfuric acid under a nitrogen atmosphere at 160° C. for 23 hours. The reaction mixture was poured onto ice and ether extracted to yield 109 grams of product, soluble in sodium hydroxide solution and with the following boiling points and neutralization equivalents:

| Fraction | Wt., gms. | Observed N. E. |
|---|---|---|
| 1. 100/130° C./0.5 mm | 60 | |
| 2. 130–145° C./0.5 mm | 49 | 139 |

Calculated N. E.

—$HOOC-CF_2-CFCl-CF_2-COOH=128$;
$$CCl_3-CF_2-CFCl-CF_2-COOH=330.$$

From the neutralization equivalent it was apparent that fraction (2) was primarily the diacid 3-chloropentafluoroglutaric acid.

(c) Preparation of lead salt of hydrolysis product of
$$CCl_3(CF_2CFCl)_2Br$$

One gram of the hydrolysis product of
$$CCl_3(CF_2CFCl)_2Br$$
(fraction 3 of Example 1a, B. P. 139–47° C./20 mm.) was stirred with water and excess lead carbonate. The excess carbonate was then removed by filtration and the water soluble salt (1.05 grams) obtained by evaporation of the water.

(d) Preparation of calcium salt of hydrolysis product of
$$CCl_3(CF_2CFCl)_2Br$$

The calcium salt of the hydrolysis product of
$$CCl_3(CF_2CFCl)_2Br$$
(fraction 3 of Example 1a) was prepared in the same way as described in 1c above, except that an excess of calcium carbonate was used.

EXAMPLE 2

Hydrolysis of $CCl_3-(CF_2-CFCl)_3Br \rightarrow$
$$HOOC-(CF_2CFCl)_2-CF_2-COOH$$

The hydrolysis of 400 grams of (0.73 mole) of $CCl_3-(CF_2-CFCl)_3Br$ (B. P. 146–48° C./10 mm.) was effected by heating with 100 ml. of 65% fuming sulfuric acid and 215 ml. of concentrated sulfuric acid under an atmosphere of nitrogen to 160° C. for 25 hours. The alkali soluble product (261 grams corresponding to a yield of 96%), isolated as described in the above example, boiled at 145–165° C./0.2 mm. The product is identified as $HOOC-(CF_2CFCl)_2-CF_2-COOH$ (3,5-dichlorooctafluoropimelic acid) by analysis for chlorine and fluorine content and by its neutralization equivalent.

Calculated for $C_7H_2O_4Cl_2F_8$: Cl, 19.00; F, 40.75; N. E. 186. Found: Cl, 18.94; F, 41.09; N. E. 196.

EXAMPLE 3

*Hydrolysis of predominantly $C_7$ and $C_9$ fraction*

Oil (635 grams) obtained from the telomerization of chlorotrifluoroethylene with bromotrichloromethane (distilled fraction, B. P. 85–120° C./0.5 mm.) was hydrolyzed with 500 ml. of 20% fuming sulfuric acid under a nitrogen atmosphere by heating to 180–190° C. for 48 hours until bromine evolution was no longer observed. The solution was then homogeneous and was cooled, poured onto ice and the aqueous solution separated from the insoluble organic material and ether extracted. The concentrated ether extract and organic material were combined and distilled in vacuo to obtain the following alkali soluble fractions:

| Fraction | Boiling point | Weight (g.) | Observed N. E. |
|---|---|---|---|
| 1 | 150–160° C./0.4 mm | 43.3 | 202 |
| 2 | 160/0.4–170–.1 mm | 167 | 158 |
| 3 | 170/0.1–185/0.2 mm | 133 | 193 |
| 4 | 182/0.2–205/0.1 mm | 105 | 243 |
| | | 448.3 | |

Calculated N. E.'s:

$HOOC-(CF_2-CFCl)_3-CF_2-COOH=245$ (N. E. of $C_9$ monoacid=563)

$HOOC-(CF_2-CFCl)_2-CF_2-COOH=186$ (N. E. of $C_7$ monoacid=446)

Fraction 4 was identified as the $C_9$ diacid 3,5,7-trichloroendecafluoroazelaic acid while the lower fractions appeared to be primarily mixtures of diacids.

EXAMPLE 4

*Hydrolysis of predominantly $C_{11}$ and $C_{13}$ fraction*

Oil (610 grams) obtained from the telomerization of chlorotrifluoroethylene with bromotrichloromethane (distilled fraction, B. P. 100–170° C./0.1 mm.) was hydrolyzed with 500 ml. of 20% fuming sulfuric acid under a nitrogen atmosphere by heating to 190–210° C. for 40 hours. A total yield of 415 grams of acidic product, insoluble in methylene chloride, was obtained. The neutralization equivalent was found to be equal to 294.

Calculated N. E.'s:

$HOOC-(CF_2-CFCl)_4-CF_2-COOH=303$ $HOOC-(CF_2-CFCl)_5-CF_2-COOH=360$

EXAMPLE 5

*Hydrolysis of* $CCl_3(CF_2-CFCl)_2Br$ *to acid anhydride*

A mixture of $CCl_3(CF_2-CFCl)_2Br$ (431 grams) and 10% fuming sulfuric acid (400 ml.) was heated with stirring to 140° for 36 hours. The product was distilled directly from the reaction flask and redistilled through an 18 inch helical column. 190 grams (80%) of diacid anhydride, B. P. 102–102.5° was obtained.

| | N. E. | Cl | F | M. R. | $n_d^{20}$ | $d_{25}^{25}$ |
|---|---|---|---|---|---|---|
| Calculated for 3-chloropentafluoroglutaric anhydride | 119.2 | 14.86 | 39.79 | 30.3 | | |
| Found | 118.5 | 14.94 | 41.10 | 31.1 | 1.3630 | 1.704 |

An additional 12% yield was obtained by extraction of the sulfuric acid layer with $CF_2Cl-CFCl_2$. Total yield 92%.

EXAMPLE 6

*Hydrolysis of* $CCl_3(CF_2-CFCl)_2Br$

A mixture of $CCl_3(CF_2-CFCl)_2Br$ (442 grams; 1.02 mole) and 400 ml. of absolute (100%) sulfuric acid was heated to 125° C. for 24 hours with stirring. Red fumes were evolved throughout the reaction. The cooled two-phase mixture was diluted with 150 ml. of water, and extracted with $CF_2-Cl-CFCl_2$. The product was decolorized with saturated sodium bisulfite solution, concentrated and distilled through an 18 inch spiral column. 40 grams of a liquid boiling at 80–90° C. at 20 mm. was identified as 3,5,5,5-tetrachloropentafluorovaleric anhydride $(CCl_3-CF_2-CFCl-CF_2-COO)_2O$.

$n_D^{20} = 1.4205$
$d_{20}^{20} = 1.94$
N. E. = 321 (calc.); 284 (found)
M. R. = 84.7 (calc.); 84.3 (found)

The anhydride structure was confirmed by infra red analysis.

We claim:

1. A novel polyhalogenated fluorine-containing carboxylic compound of the group consisting of acids having the formula $$Z-(CF_2-CFCl)_{n-1}-CF_2COOH$$

wherein Z is a single carbon mono-functional radical selected from the group consisting of carboxylic acid radicals and perhalomethyl radicals having a total atomic weight not higher than 146.5, and $n$ is an integer from 2 to 16.

2. A novel fluorine-containing carboxylic compound of the group consisting of acids of the formula $$CCl_3-(CF_2-CX_1X_2)_{n-1}-CF_2-COOH$$

wherein $X_1$ and $X_2$ are selected from the group consisting of fluorine and chlorine atoms, and $n$ is an integer from 2 to 16.

3. A novel perhalogenated fluorine-containing acid of the formula $$CCl_3-(CF_2-CFCl)_{n-1}-CF_2COOH$$

wherein $n$ is an integer from 2 to 16.

4. A novel perhalogenated fluorinated dicarboxylic acid having the formula $$HOOC-(CF_2-CFCl)_{n-1}-CF_2COOH$$

wherein $n$ is an integer from 2 to 16.

5. 3,5,7,7,7-pentachlorooctafluoro enanthic acid.
6. 3-chloropentafluoroglutaric anhydride.
7. 3,5,7-trichloroendecafluoroazelaic acid.
8. 3,5-dichlorooctofluoropimelic acid.
9. 3,5,5,5-tetrachloropentafluorovaleric acid.
10. A method of preparing a novel fluorinated acid which comprises treating fluorine-containing telomer having the formula $$M-(CF_2-CX_1X_2)_n-Br$$

wherein M is a perhalomethyl radical having a total atomic weight not higher than 146.5, $X_1$ and $X_2$ are halogen atoms selected from the group consisting of fluorine and chlorine atoms, and $n$ is an integer from 2 to 16 with fuming sulfuric acid at a temperature between about 125° C. and about 300° C.

11. A method of preparing a novel fluorinated acid which comprises treating fluorine-containing telomer having the formula $$CCl_3-(CF_2-CX_1X_2)_n-Br$$

wherein $X_1$ and $X_2$ are halogen atoms selected from the group consisting of fluorine and chlorine atoms, and $n$ is an integer from 2 to 16 with fuming sulfuric acid at a temperature between about 125° C. and about 300° C.

12. A method of preparing a perhalogenated fluorine-containing acid which comprises treating a telomer of the formula $$CCl_3-(CF_2-CFCl)_n-Br$$

wherein $n$ is an integer from 2 to 16, with fuming sulfuric acid at a temperature between about 125° C. and about 300° C.

13. The method of claim 12 wherein the treatment is carried out with concentrated sulfuric acid containing between about 10 and about 70 percent of sulfur trioxide at a temperature ranging from about 125° C. to about 300° C. for a period ranging from about 5 to about 50 hours.

14. The method of making a perhalogenated fluorine-containing monocarboxylic acid which comprises treating a telomer of the formula $$CCl_3-(CF_2-CFCl)_n-Br$$

wherein $n$ is an integer from 2 to 16, with fuming sulfuric acid containing less than about 20 percent of sulfur trioxide at a temperature between about 125° C. and about 175° C. for a period of time between about 10 and about 25 hours.

15. A method of preparing a perhalogenated fluorine-containing dicarboxylic acid which comprises treating a telomer of the formula $$CCl_3-(CF_2-CFCl)_n-Br$$

wherein $n$ is an integer from 2 to 16, with fuming sulfuric acid containing from about 10 percent to about 70 percent of sulfur trioxide at a temperature between about 160° C. and about 300° C. for a period between about 40 hours and about 50 hours.

16. A method of preparing 3,5,5,5-tetrachloropentafluorovaleric acid which comprises treating 1 bromo-1,3,5,5,5-pentachlorohexafluoropentane with fuming sulfuric acid containing about 20 percent of sulfur trioxide at a temperature between about 130° and about 140° C. for a period of about 10 hours.

17. A method of making 3,5-dichlorooctafluoropimelic acid which comprises treating 1 bromo-1,3,5,7,7,7-hexachlorononafluoroheptane with fuming sulfuric acid containing about 65 percent of sulfur trioxide at a temperature of about 160° C. for about 25 hours.

18. A method of making 3-chloropentafluoroglutaric anhydride which comprises treating 1 bromo-1,3,5,5,5-tetrachlorohexafluoropentane with fuming sulfuric acid containing about 10 percent of sulfur trioxide at a temperature of about 140° C. for about 36 hours.

References Cited in the file of this patent

UNITED STATES PATENTS

| | | |
|---|---|---|
| 2,398,430 | Joyce | Apr. 16, 1946 |
| 2,440,800 | Hanford et al. | May 4, 1948 |
| 2,562,547 | Hanford et al. | July 31, 1951 |
| 2,567,011 | Diesslin et al. | Sept. 4, 1951 |
| 2,606,206 | Guenthner | Aug. 5, 1952 |